6271X
Blake & Cushing,
Wrench.
Patented Dec. 14, 1830.
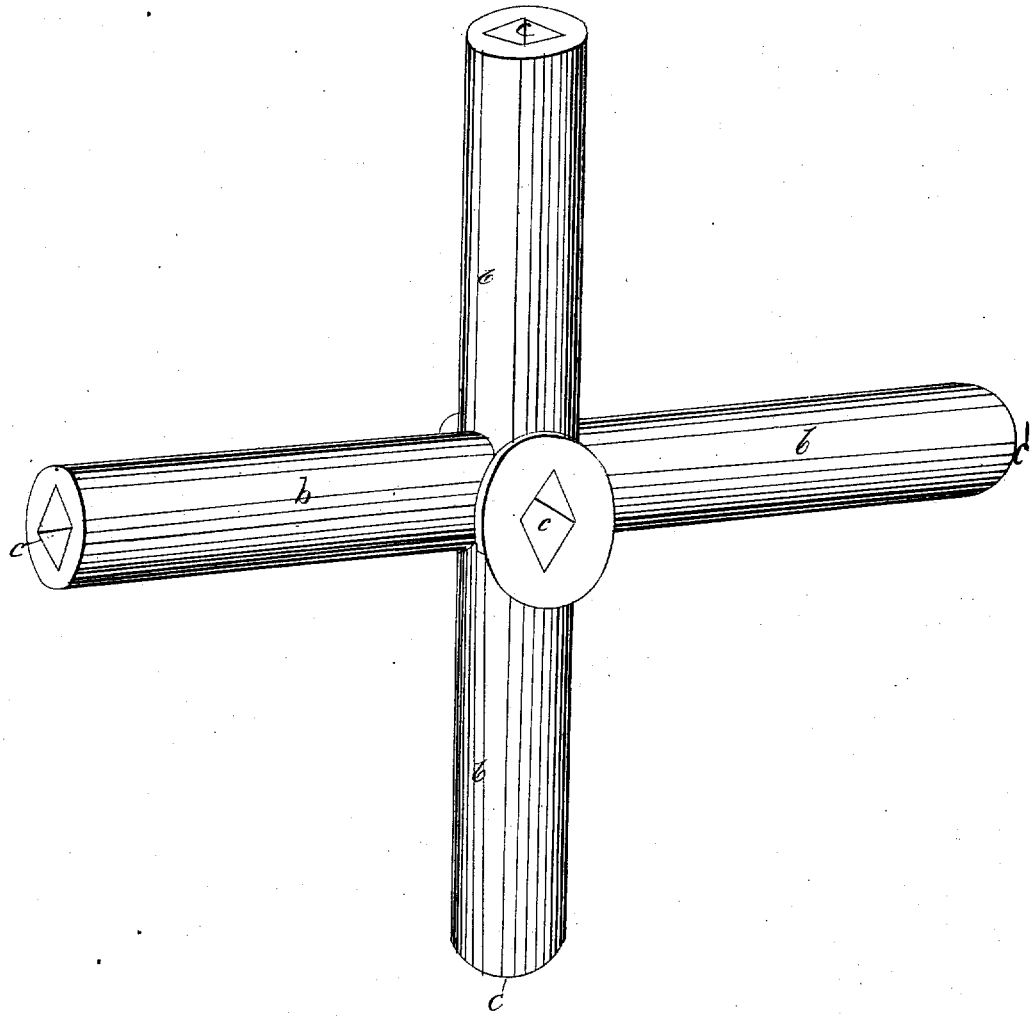
N. PETERS, PHOTO-LITHOGRAPHER, WASHINGTON, D. C.

Judson Blake and Daniel Cushing

Letters Patent.

The Schedule referred to in these Letters Patent and making part of the
same containing a description in the words of the said Judson Blake
and Daniel Cushing themselves of their improvement in the "Bed
Key" —

The Improved Bed Key is a substitute for the common
Bed Key and is made of the following or similarly appropriate substance
form and dimensions Viz. The material or substance of which
the improved Bed Key is made is cast iron. but Brass copper or the
like may be substituted. The form is somewhat changed in dif-
ferent Keys according to the number of sizes of Bed screws. which the
Keys respectively are calculated to fit. But a fully made Key consists
of a centre and four arms or shafts extending from the centre at
right angles and in the same line with each other. The centre is
flat and each arm or shaft is round and has a square opening
in the extremity of it being a socket. for the reception of the head of
the screw. The general dimensions of the improved Bed Key
will admit of much variation. A convenient size however may
be as follows Viz The centre being one and a half inch in diame-
ter. and one inch thick. each arm being four inches long and
one inch in diameter. the openings or sockets half an inch square
and some of them more and some of them less. each opening or sock-
et differing in size from any other in the same Key. the number
of arms is not confined to four. but may be one, two, three, four
or more at pleasure a square hole is made through the centre from
side to side of a different size from any in the arms. and this adds to
the number of sockets. or the centre may be oblong instead of circu-
lar. having several square holes through it. to accommodate screws
of different sizes. — This little instrument is to be cast after a pat-
tern in the usual manner of casting iron brass and copper ware
and the mode of using it is the same as that of using the common Tubal Key. The superiority of this improvement over the common bed Key consists in its fitting screws of a greater number of sizes and of its being made of such materials and in such a manner as to deter life from the Key now in use Witnesses
Wm. John A Wadsworth
N. B. Snow Judson Blake
Daniel Cushing (455 Words